United States Patent
Nagaya et al.

(10) Patent No.: US 10,967,265 B2
(45) Date of Patent: Apr. 6, 2021

(54) STORAGE MEDIUM, GAME SYSTEM, GAME APPARATUS AND GAME CONTROLLING METHOD

(71) Applicant: NINTENDO CO., LTD., Kyoto (JP)

(72) Inventors: Masahiko Nagaya, Kyoto (JP); Koichi Kishi, Kyoto (JP); Takeshi Ando, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 16/783,439

(22) Filed: Feb. 6, 2020

(65) Prior Publication Data

US 2020/0330867 A1 Oct. 22, 2020

(30) Foreign Application Priority Data

Apr. 19, 2019 (JP) .............................. JP2019-079802

(51) Int. Cl.
*A63F 13/285* (2014.01)
*A63F 13/5255* (2014.01)
*A63F 13/577* (2014.01)
*A63F 13/92* (2014.01)
*A63F 13/24* (2014.01)

(52) U.S. Cl.
CPC .......... *A63F 13/5255* (2014.09); *A63F 13/24* (2014.09); *A63F 13/285* (2014.09); *A63F 13/577* (2014.09); *A63F 13/92* (2014.09); *A63F 2300/1037* (2013.01); *A63F 2300/6676* (2013.01)

(58) Field of Classification Search
CPC ........ A63F 13/10; A63F 13/25; A63F 13/285; A63F 13/40; A63F 13/45; A63F 13/50; A63F 13/52; A63F 13/537; A63F 13/5372; A63F 13/54; A63F 13/55; A63F 13/56; A63F 2300/204; A63F 2300/305; A63F 2300/306; A63F 2300/60; A63F 2300/64; A63F 2300/643; A63F 2300/65; A63F 2300/66; A63F 2300/6607; A63F 2300/6623
See application file for complete search history.

(56) References Cited

U.S. PATENT DOCUMENTS

2018/0200620 A1   7/2018   Yamashita et al.

FOREIGN PATENT DOCUMENTS

JP   2018-112953   7/2018

*Primary Examiner* — Omkar A Deodhar
(74) *Attorney, Agent, or Firm* — Nixon & Vanderhye PC

(57) ABSTRACT

A non-limiting example game system comprises a main body apparatus, and a left controller and a right controller are attachably and detachably attached to the main body apparatus. Each of the left controller and the right controller is provided with a plurality of operation buttons, an analog stick and a vibrator. A player character is provided with a radar object, and a rod-like determination object having one end that is located at a center of the character object is rotated within a plane parallel to a horizontal plane in a virtual space. When the determination object touches an enemy character, the vibrator of the left controller or/and the right controller is caused to vibrate.

24 Claims, 17 Drawing Sheets

WORLD COORDINATES SYSTEM

WORLD COORDINATES SYSTEM

STORAGE MEDIUM, GAME SYSTEM, GAME APPARATUS AND GAME CONTROLLING METHOD

CROSS REFERENCE OF RELATED APPLICATION

The disclosure of Japanese Patent Application No. 2019-079802 filed on Apr. 19, 2019 is incorporated herein by reference.

FIELD

This application describes a storage medium, a game system, a game apparatus and a game controlling method, in which a position of an object in a virtual space is indicated by vibration.

SUMMARY

It is a primary object of an embodiment(s) to provide a novel storage medium, game system, game apparatus and game controlling method.

It is another object of the embodiment(s) to provide a storage medium, game system, game apparatus and game controlling method, capable of indicating a position of an object in a virtual space by vibration.

A first embodiment is a non-transitory computer-readable storage medium having stored therein a game program executable by a computer comprising one or more processors of an information processing apparatus, wherein the game program causes the one or more processors to execute: controlling an operation object in a virtual space based on an operation input to an operation device; arranging a target object that is a search target in the virtual space; setting a determination area for searching for the target object in the virtual space; rotating the determination area at a predetermined speed around a position of the operation object; and generating a vibration signal for causing a vibration device provided in the operation device to vibrate when the target object touches the determination area.

According to the first embodiment, it is possible to provide a novel game program. Moreover, since the target object is searched by rotating the determination area, it is possible to indicate, by vibration, a position of the target object in a 360-degree direction around the position of the operation object. Therefore, it is possible for a player to specify, by vibration, the position of the target object in the 360-degree direction around the position of the operation object.

A second embodiment is the storage medium according to the first embodiment, wherein the game program causes the one or more processors to execute generating the vibration signal when the determination area touches the target object so as to vibrate more strongly when a distance between the operation object and the target object in the virtual space is shorter than a predetermined distance.

According to the second embodiment, since the distance between the operation object and the target object can be known by intensity of the vibration, it is possible to specify the position of the target object with respect to the operation object more easily.

A third embodiment is the storage medium according to the first embodiment, wherein the game program causes the one or more processors to execute changing the predetermined speed at which the determination area is rotated according to a distance between the operation object and the target object in the virtual space.

According to the third embodiment, since the predetermined speed at which the determination area is rotated is changed, it is possible to know whether the operation object is approaching or moving away from the target object according to intervals of the vibration. That is, it is possible to make easier to specify the position of the target object with respect to the operation object.

A fourth embodiment is the storage medium an according to the first embodiment, wherein the operation device comprises a plurality of vibration devices, and the game program causes the one or more processors to execute generating the vibration signal when the target object touches the determination area so that intensity of the vibration of any of the plurality of vibration devices is increased according to a direction of a position of the target object with respect to the operation object.

According to the fourth embodiment, in a case of comprising a plurality of vibration devices, since the intensity of the vibration of any one of the plurality of vibration devices is increased according to the direction of the position of the target object with respect to the operation object, it is possible to specify or grasp more easily the position of the target object with respect to the operation object according to the intensity of the vibration.

A fifth embodiment is the storage medium an according to the first embodiment, wherein the game program causes the one or more processors further to execute arranging a direction object indicating that the search is being performed at the position of the operation object, and rotating the direction object at the same speed as the speed of rotation of the determination area.

According to the firth embodiment, since it is possible to know movement of the determination area according to movement of the direction object, the rotation of the determination area becomes easier to be understood, and therefore, the position of the target object with respect to the operation object can be more easily specified or grasped.

A sixth embodiment is the storage medium according to the first embodiment, wherein the game program causes the one or more processors further to execute making, based on an operation input, the operation object perform a predetermined action to the target object.

According to the sixth embodiment, by making the operation object touch the target object or obtain the target object, the operation object can be used, in a game for searching for hidden objects, for example.

A seventh embodiment is a game system comprising a control circuit and an operation device, wherein the control circuit is configured to execute: controlling an operation object in a virtual space based on an operation input to the operation device; arranging a target object that is a search target in the virtual space; setting a determination area for searching for the target object in the virtual space; rotating the determination area at a predetermined speed around a position of the operation object; and generating a vibration signal for causing a vibration device provided in the operation device to vibrate when the target object touches the determination area.

An eighth embodiment is a game apparatus comprising a control circuit and an operation device, wherein the control circuit is configured to execute: controlling an operation object in a virtual space based on an operation input to the operation device; arranging a target object that is a search target in the virtual space; setting a determination area for searching for the target object in the virtual space; rotating the determination area at a predetermined speed around a position of the operation object; and generating a vibration signal for causing a vibration device provided in the operation device to vibrate when the target object touches the determination area.

A ninth embodiment is a game controlling method, comprising: controlling an operation object in a virtual space based on an operation input to an operation device; arranging a target object that is a search target in the virtual space; setting a determination area for searching for the target object in the virtual space; rotating the determination area at a predetermined speed around a position of the operation object; and generating a vibration signal for causing a vibration device provided in the operation device to vibrate when the target object touches the determination area.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
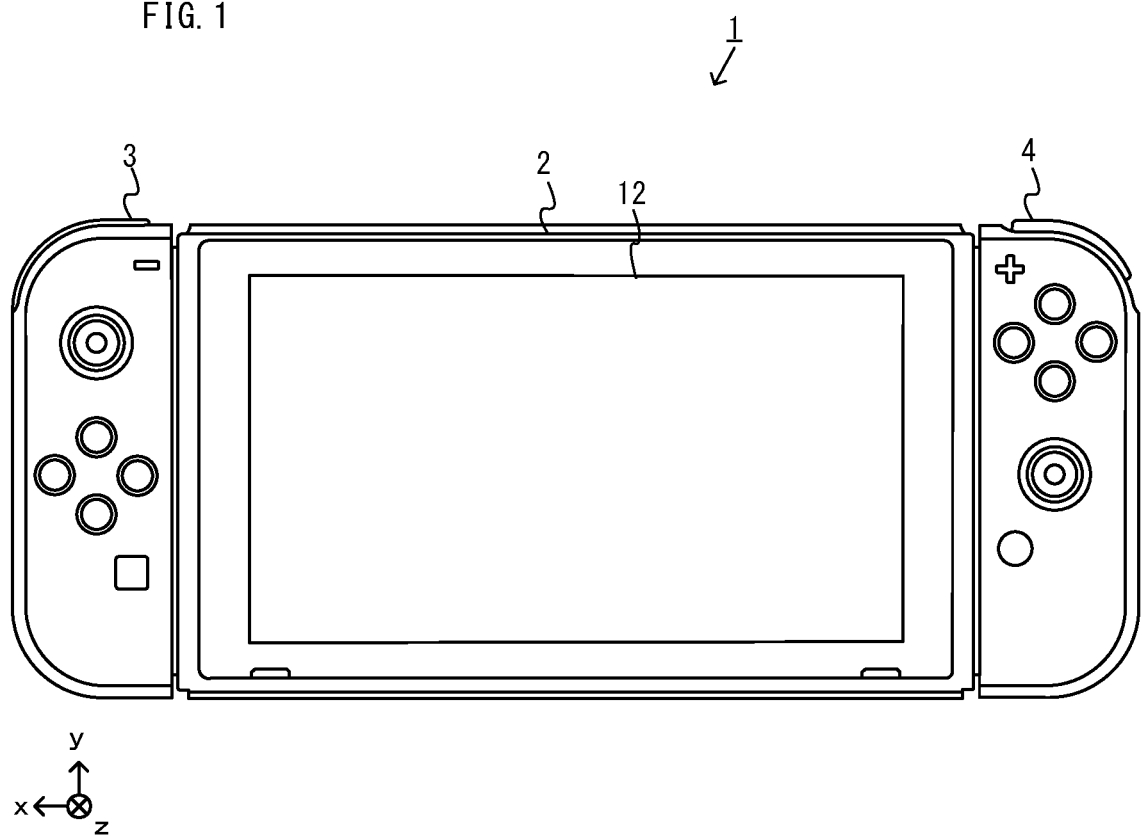
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
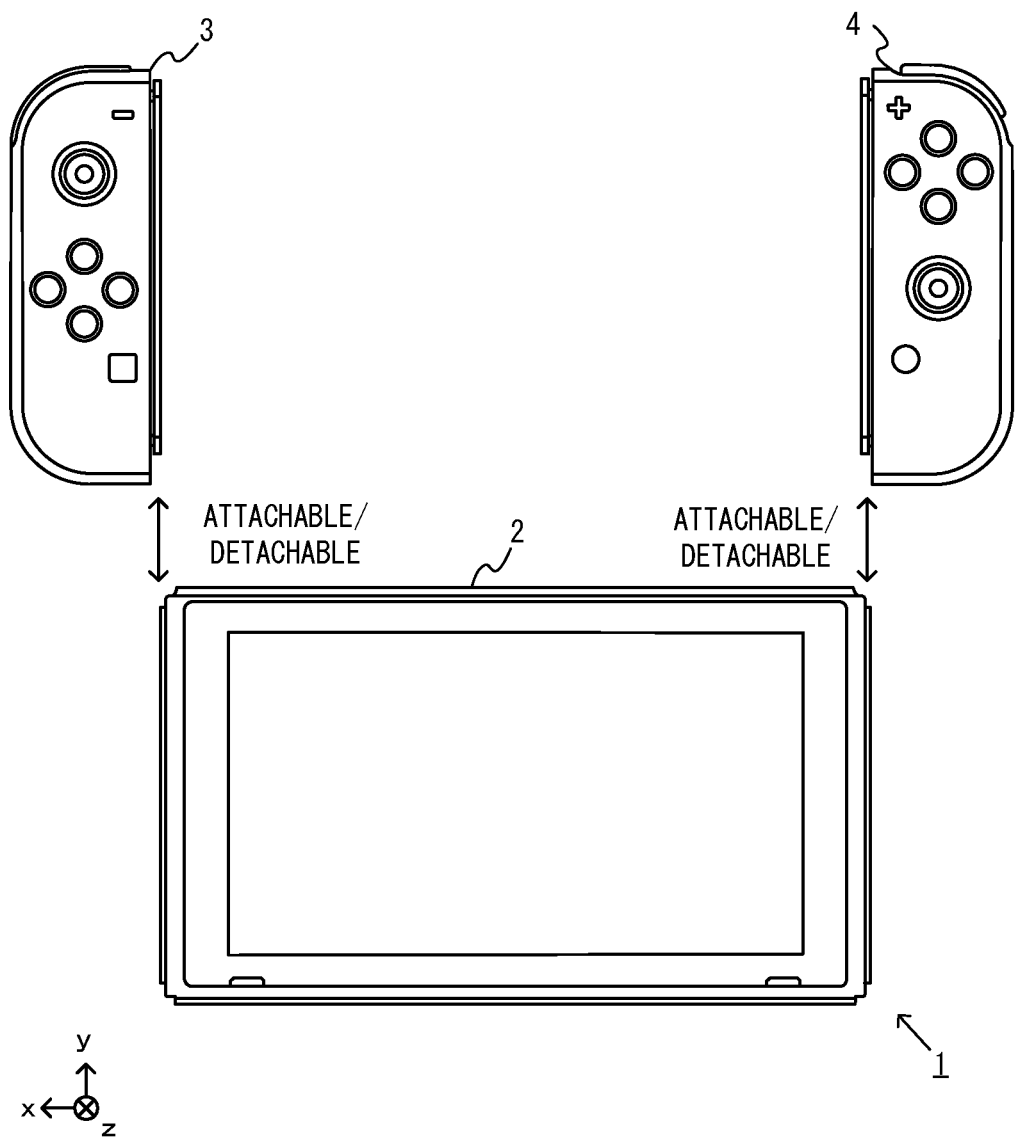
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
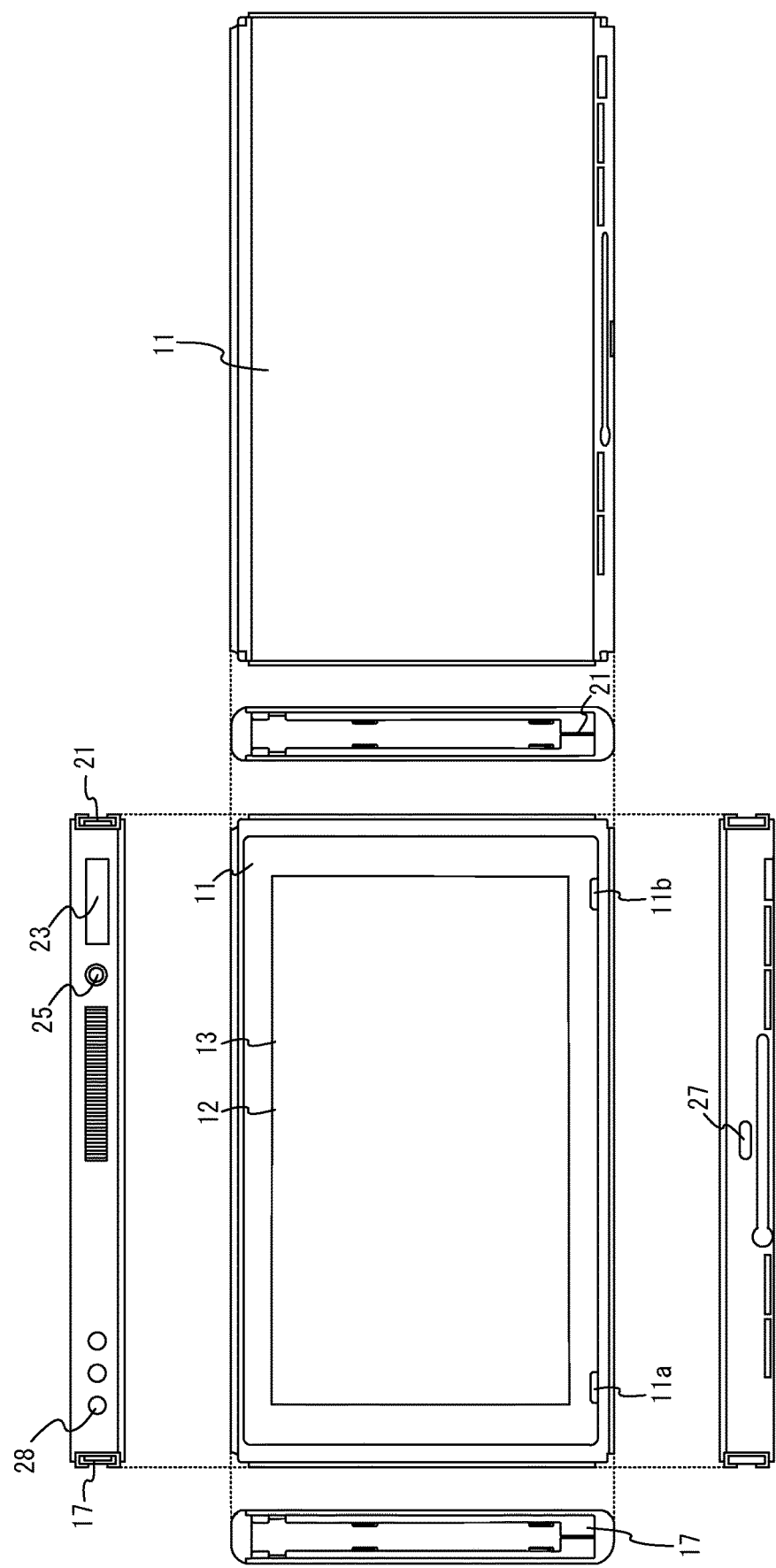
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display.

Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
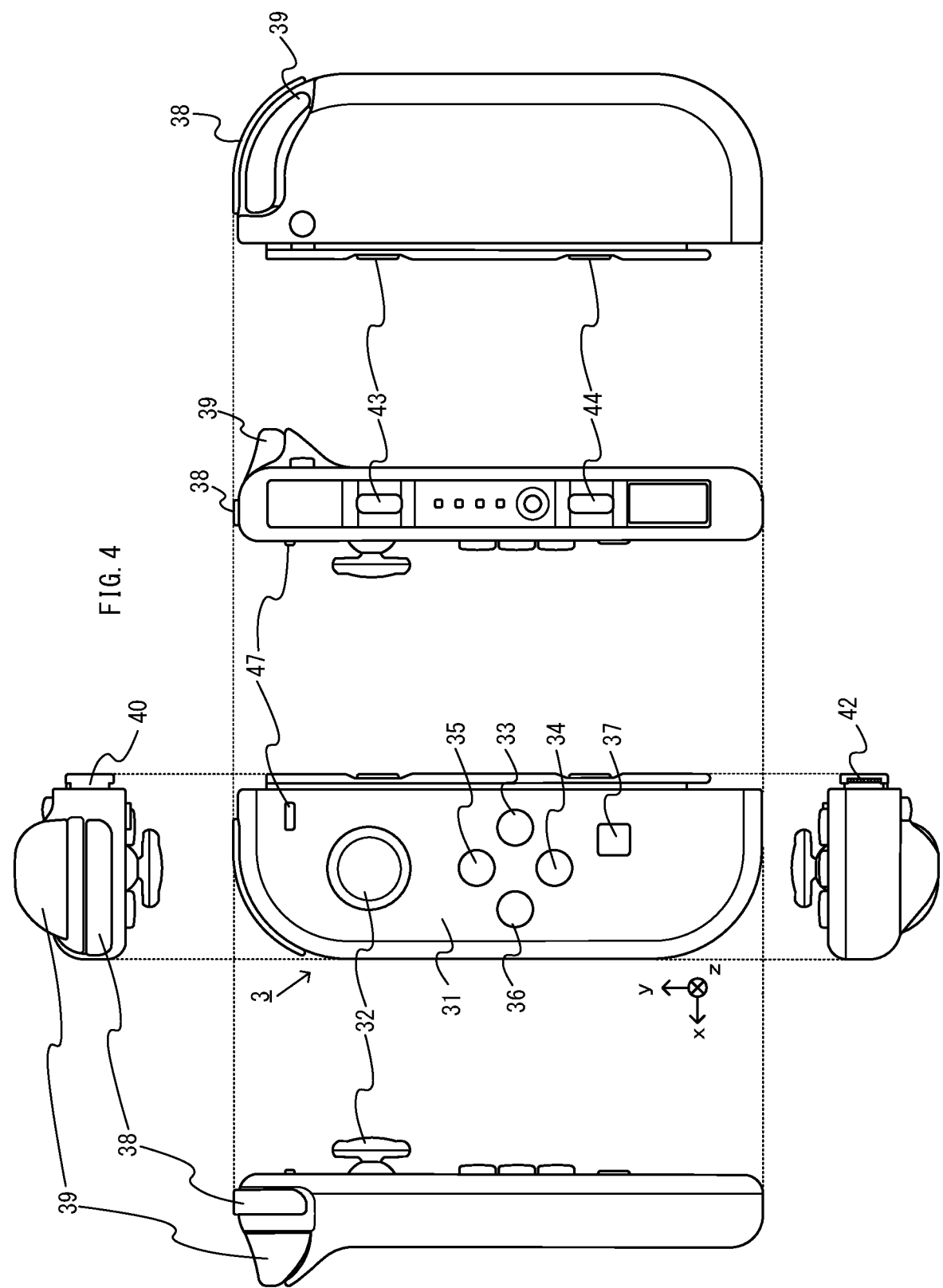
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
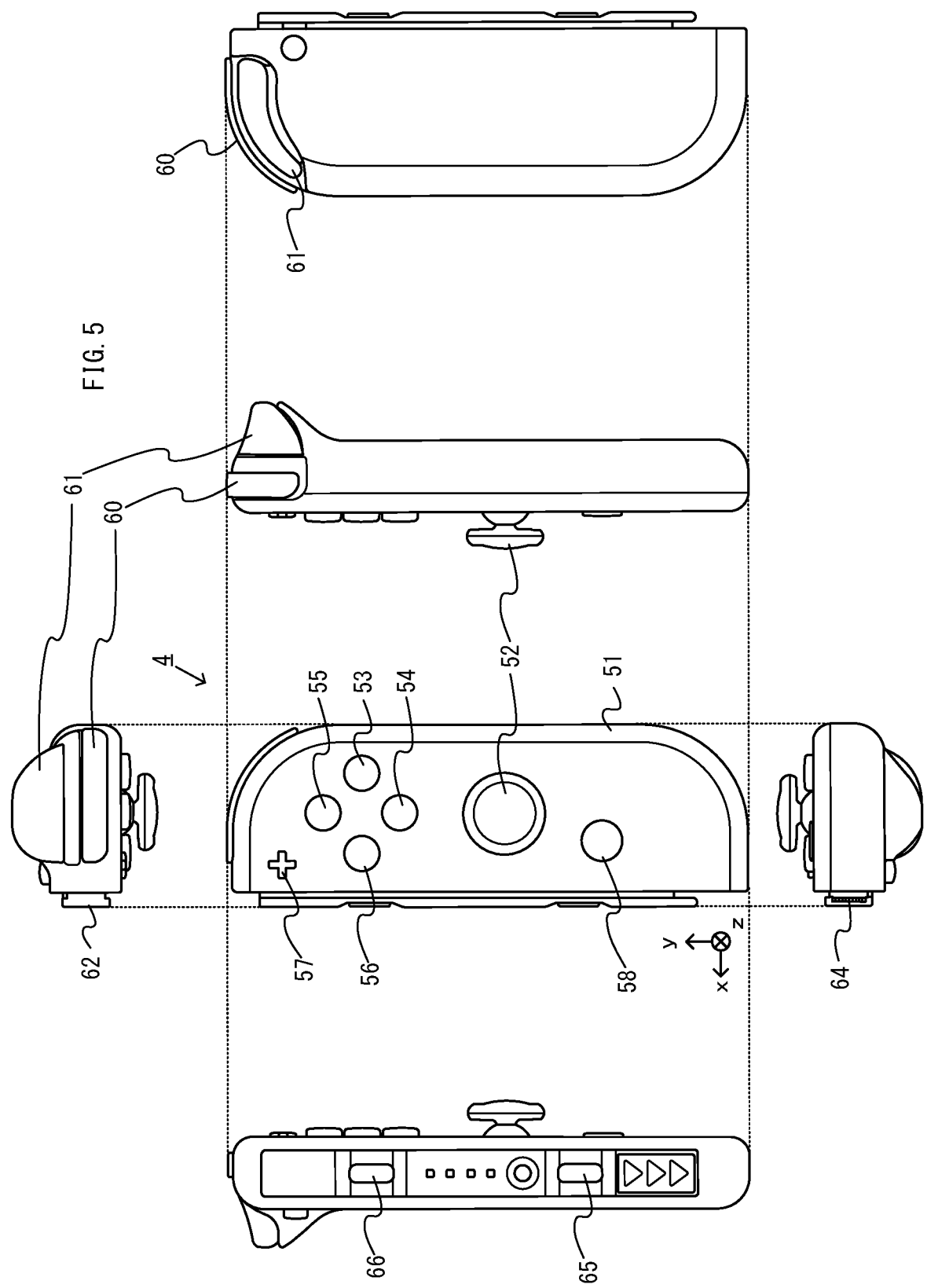
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
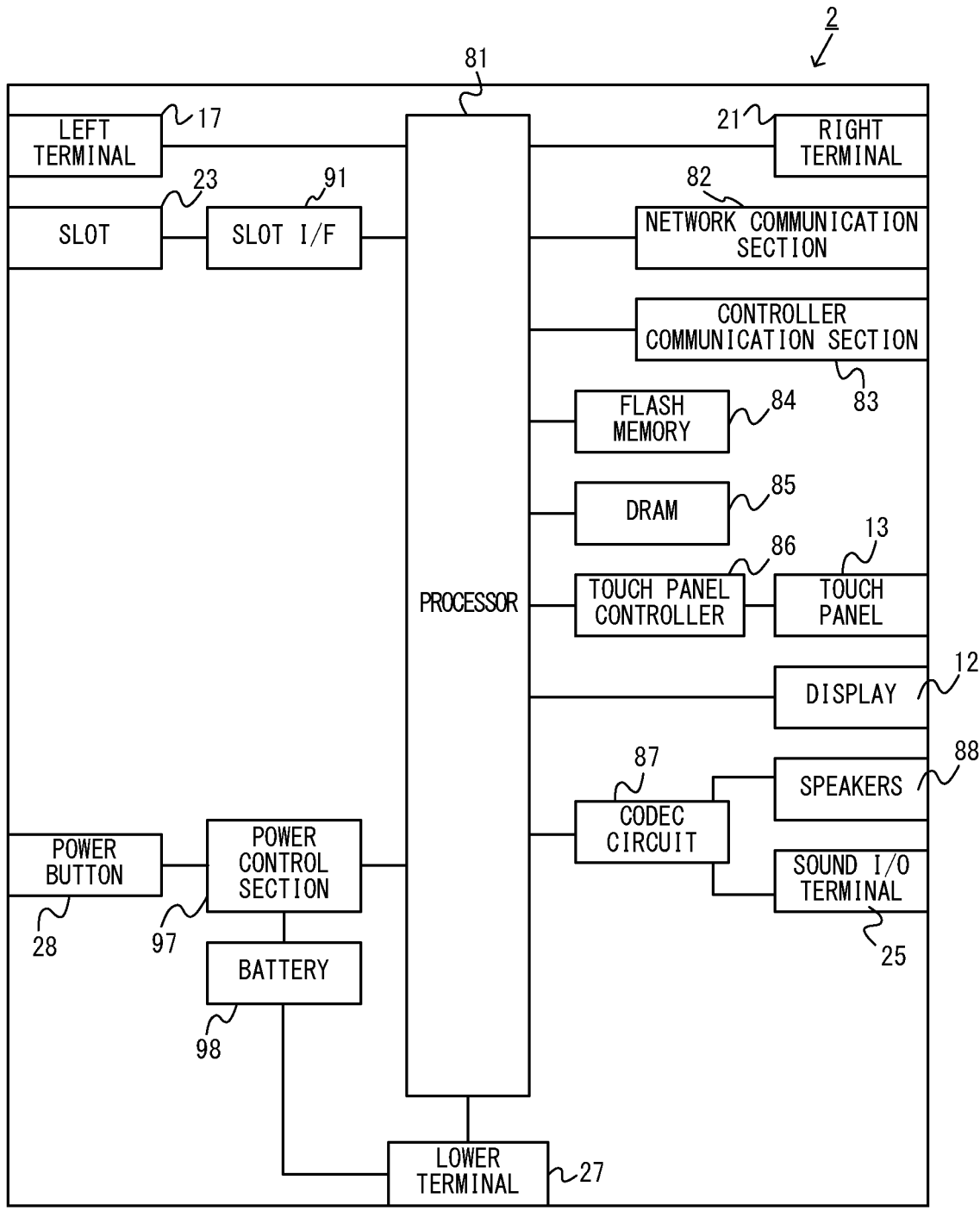
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG.

3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data.

The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle)

is connected to the lower terminal 27, and power is supplied to the main body apparatus 2 via the lower terminal 27, the battery 98 is charged with the supplied power.

Figure 7:
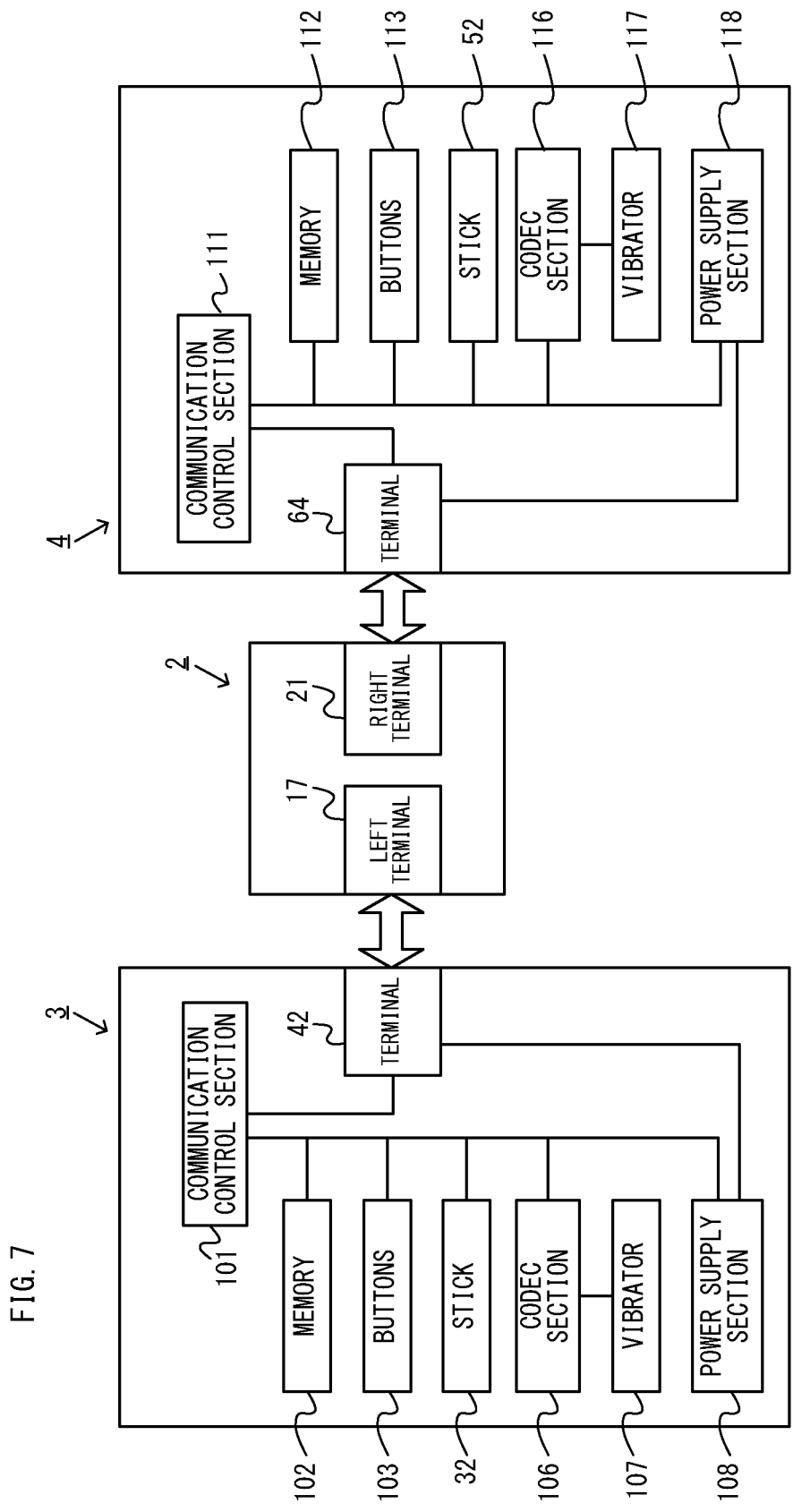
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example.

Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 comprises a power supply section 118. The power supply section 118 has a function similar to the power supply section 108 of the left controller 3, and operates similarly to the power supply section 108.

Figure 8:
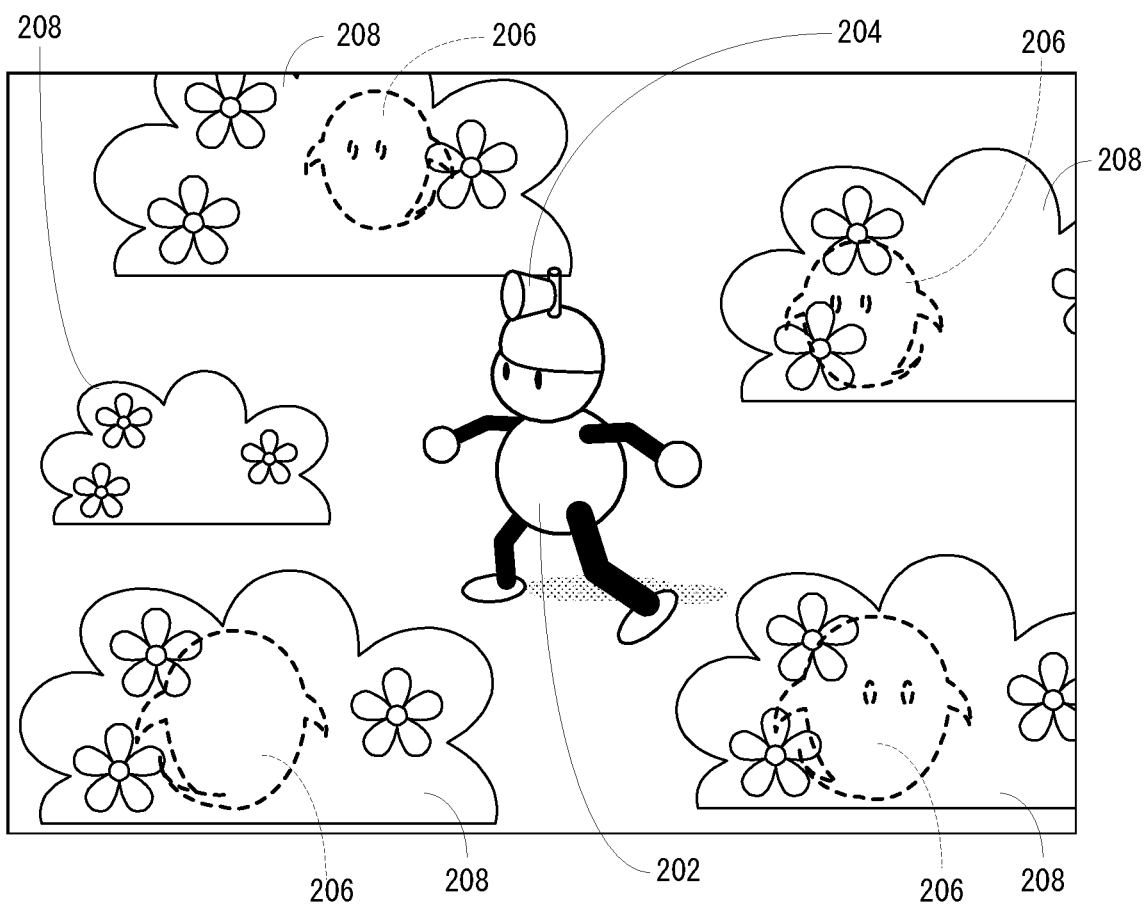
FIG. 8 is an illustration view showing a non-limiting example game image.

Next, with reference to FIG. 8, an outline of non-limiting example game processing of a virtual game executable in the game system 1 according to this embodiment will be described. FIG. 8 is an illustration view showing a non-limiting example game image displayed on a display (for example, the display 12) when an application of the virtual game according to this embodiment is executed.

As shown in FIG. 8, a game screen 200 as the non-limiting example game image includes a player character 202, and a radar object 204 as an item for searching for an enemy character 206 is attached to the player character 202. Moreover, the game screen 200 includes the enemy character 206 and a background object 208, and the enemy character 206 is arranged to be hidden by the background object 208.

In addition, although the example shown in FIG. 8 shows a manner that the enemy character 206 is hidden by the background object 208, the enemy character 206 does not need to be hidden. For example, there is a case where the enemy character 206 is searched in a scene where the player character 202, the enemy character 206 and other non-player character(s) different from the enemy character 206 exist. That is, the game processing of this embodiment is effective in purpose of searching for a hidden search target, but can also be used in a case of searching for a non-hidden target.

The player character 202 is a character or object whose execution of a predetermined action is controlled according to an operation of a player. The predetermined action of the player character 202 corresponds to moving, acquiring an item, searching for the enemy character 206, attacking the enemy character 206, or defending an attack of the enemy character 206, etc., in a virtual certain place, i.e., a virtual space. In this embodiment, since the player character 202 is equipped with the radar object 204, the radar object 204 is also moved according to movement of the player character 202.

The radar object 204 is an object imitating a radar that searches for the enemy character 206, and is rotated around an axis 204a on the head of the player character 202. Since the radar object 204 is displayed rotated, it is shown (directed) that the player character 202 or the radar object 204 is searching for the enemy character 206.

A plurality of non-player characters including the enemy character 206 are characters or objects whose predetermined actions are respectively controlled by a computer (the processor 81 of FIG. 6) rather than an operation by the player. The predetermined action of the non-player character corresponds to moving, attacking the player character 202, defending an attack of the player character 202, etc. However, a rotation of the radar object 204 is controlled by the computer.

The background object 208 means mainly a terrain object arranged in the virtual space. Moreover, in this embodiment, the terrain means the ground (including roads, squares, etc.), floors, trees, grass, flowers, buildings, stairs, caves, cliffs, walls, etc. In the example shown in FIG. 8, a plant (including flower) object is displayed as the background object 208.

The main body apparatus 2 functions also as an image processing apparatus, and generates and outputs (displays) display image data corresponding to various screens including the game screen 200. The processor 81 arranges various kinds of objects and characters in a three-dimensional virtual space, thereby generating a certain sight or scene. An image that is imaged this scene by a virtual camera (an image viewed from a viewpoint) is displayed on the display 12 as the game image.

Figure 9:
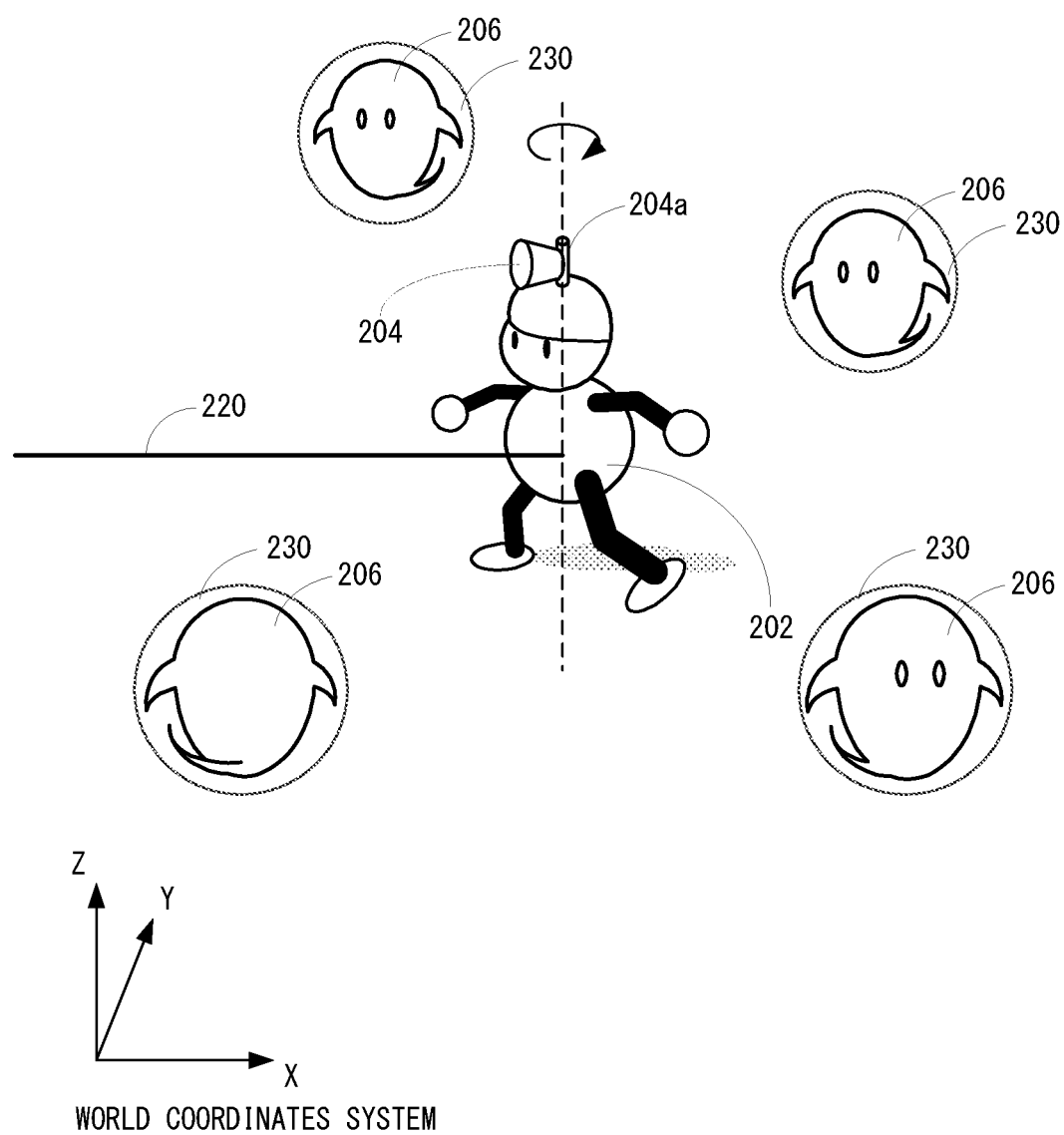
FIG. 9 is an illustration view showing a non-limiting example search method of an enemy character, using a determination object in a virtual space.

The game screen 200 shown in FIG. 8 is an image that a certain scene generated in the virtual space is imaged by the virtual camera. As shown in FIG. 9, in the virtual space, the player character 202 and a plurality of enemy characters 206 are arranged on a plane equivalent to an XY plane or a plane parallel to this XY plane. However, the background object 208 is omitted in FIG. 9.

In this embodiment, a player can cause the player character 202 to move in the virtual space by operating the analog stick 32, to search for the enemy character 206 based on a search result of the radar object 204, and to attack the enemy character 206 by operating the A button 53.

The radar object 204 is rotated around the axis 204a extending in a direction parallel to a direction of a Z-axis, thereby detecting the enemy character 206 existing in a direction that a detection plane (in this embodiment, a circular plane) faces. Since the radar object 204 is rotated, it is possible for the player character 202 or the radar object 204 to search for whether the enemy character 206 exists in a 360-degree direction in the XY plane or the plane parallel to the XY plane in the virtual space (or a world coordinates system).

However, as described later, a range capable of searching for the enemy character 206 (a search range SR) is set on the basis of the position of the player character 202 or the radar object 204 (see FIG. 10).

Moreover, a speed v that the radar object 204 is rotated (hereinafter, a "rotation speed") is changed according to a distance between the player character 202 and the enemy character 206. However, in a case where a plurality of enemy characters 206 exist in the search range SR, the rotation speed v is changed according to a distance with the enemy character 206 nearest the player character 202.

In this embodiment, the rotation speed v is set to a maximum value $v_m$ when the player character 202 approaches to the enemy character 206 with a distance less than a predetermined distance (or when the player character 202 taches the enemy character 206), and when separating by the predetermined distance or more, the rotation speed v is made slower according to the distance. For example, the rotation speed v is changed in inverse proportion to the distance or the square of the distance. Alternatively, the rotation speed v is changed gradually (stepwise) according to the distance. That is, the shorter the distance from the enemy character 206 is, the faster the radar object 204 is rotated. As described later, a vibration is generated if the enemy character 206 is detected by the radar object 204, and when the enemy character 206 exists near the player character 202, time intervals that the vibration is generated is shortened. That is, it is possible to know length of the distance between the player character 202 and the enemy character 206 by the length of the time intervals that the vibration is generated.

Figure 10:
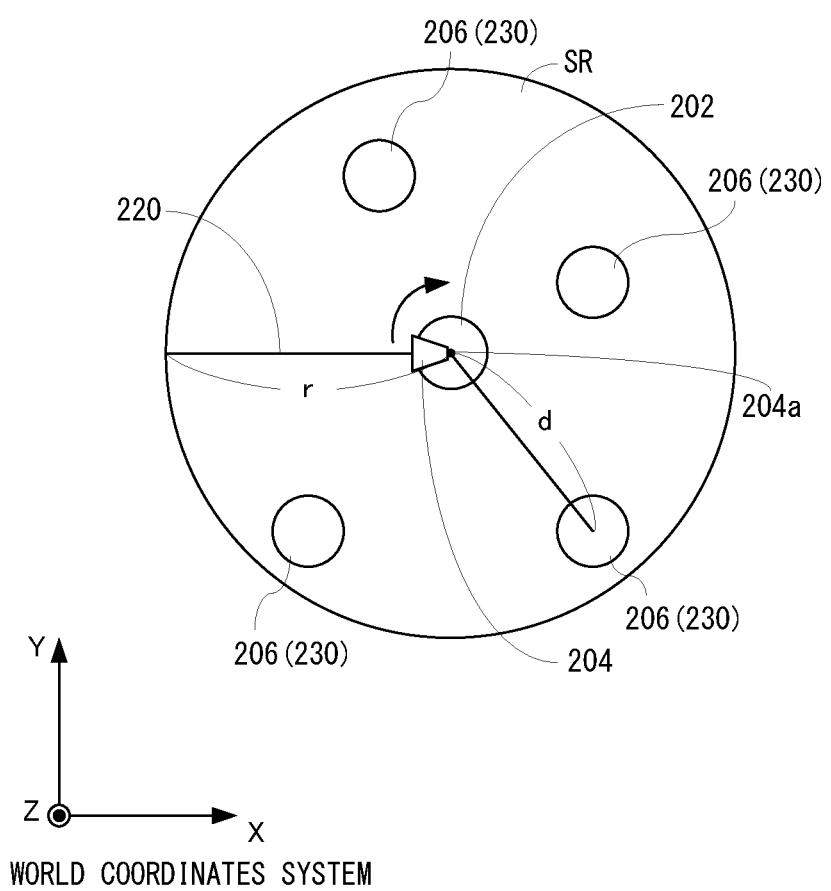
FIG. 10 is an illustration view showing the virtual space shown in FIG. 9 as viewed from the above.

FIG. 10 is an illustration view schematically showing the player character 202, the radar object 204 and the plurality of enemy characters 206 (or "simple shape 230" described later) when viewing the virtual space shown in FIG. 9 from the above. In the following, the search range SR by the player character 202 or the radar object 204 and vibration control at the time of detecting the enemy character 206 will be described with reference to FIG. 9 and FIG. 10.

As shown in FIG. 9 and FIG. 10, a world coordinates system is set in the virtual space. In this embodiment, a horizontal plane in the virtual space is set in parallel with an XY plane of the world coordinates system, and a direction perpendicular to the horizontal plane, i.e., a height direction is set in a direction of a Z-axis. However, in the example shown in FIG. 9, a transverse direction is a direction of an X-axis, and a depth direction is a direction of a Y-axis.

Moreover, the player character 202 (corresponding to an "operation object") is provided with a virtual determination object (corresponding to a "determination area") 220 for searching for the enemy character 206. The determination object 220 is a rod-like (linear) object having one end located at the center of the player character 202, and extending in parallel with the XY plane. Moreover, the determination object 220 has a predetermined length h, and is rotated in one direction (in this embodiment, clockwise) around the above-described one end within a plane parallel to the XY plane. The above-described radar object 204 is rotated according to a rotation of this determination object 220. Therefore, the determination object 220 is also rotated at the rotation speed v. In this embodiment, the determination object 220 is rotated clockwise when viewing the XY plane from the above, but may be rotated counterclockwise. Moreover, a direction to be rotated may be reversed every rotation. However, since the determination object 220 has a virtual shape, it is not drawn. For actual detection, the center of the player character 202 and the predetermined length h should just be defined.

Therefore, the determination object 220 is rotated so as to scan within a circle shown in FIG. 10. That is, a range or area of within this circle is the search range SR. The enemy character 206 existing in this search range SR is searched for or detected. That is, it is detected whether the enemy character 206 existing within the 360-degree direction with centering the player character 202 or the radar object 204.

In addition, a reason why the determination object 220 is not set at a position of the radar object 204 is to make detectable the enemy character 206 whose height is lower is than height of the player character 202 because the radar object 204 is provided on a head portion of the player character 204 in this embodiment.

Figure 11:
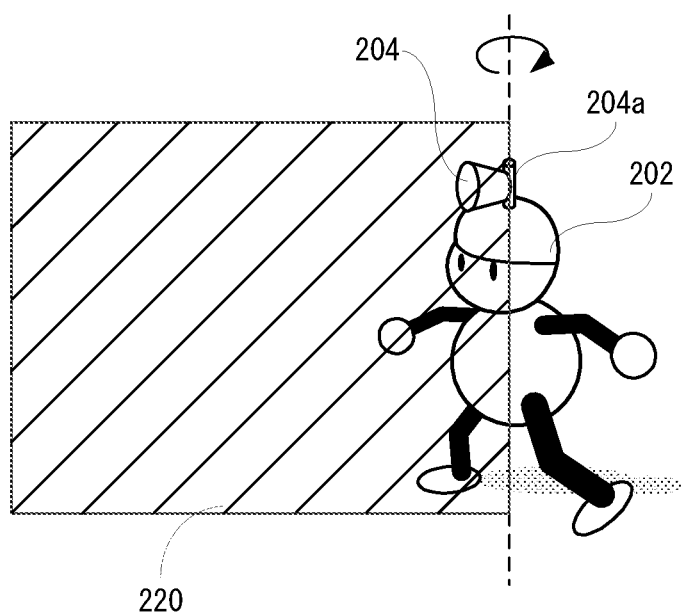
FIG. 11 is an illustration view showing another non-limiting example determination object that is set to a player character.
Figure 11:
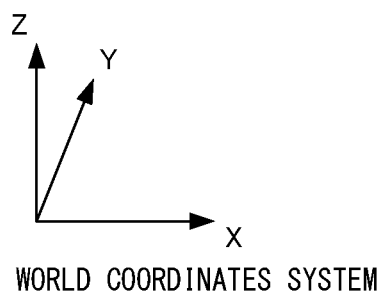

However, in order to make detectable the enemy character 206 floating in the air, the determination object 220 may have a planar shape that is also extended (or expanded) in the vertical direction (direction parallel to the Z axis) as shown in FIG. 11. In this way, it is possible to detect an enemy character 206 lower in height than the player character 202 and an enemy character 206 floating in the air. In an example shown in FIG. 11, the determination object 220 is extended from a position of the foot of the player character 202 to a position above the head. Moreover, if the length of the determination object 220 in the vertical direction is extended to a position below the foot of the player character 202, the enemy character 206 buried in the ground can be detected.

Moreover, a plurality of (three, for example) determination objects 220 may be lined in a direction of the Z-axis at intervals, instead of making the determination object 220 in the planer shape.

On the other hand, the simple shape 230 used for collision detection (hit determination) is set to the enemy character 206 that is a target object or character to be searched (corresponding to a "target object"). The simple shape 230 is a predetermined shape, and in this embodiment, as shown in FIG. 9, it is a spherical shape. Since this simple shape 230 is a virtual shape, it is not drawn. That is, in a virtual game space, a portion being a predetermined distance (that is, length determined by the radius r) from the center of the enemy character 206 is the simple shape 230. In addition, for actual detection, it is not necessary to hold the spherical shape, and the center of the enemy character 206 and the predetermined distance (radius r) should just be defined.

Moreover, in this embodiment, if the enemy character 206 is searched (detected) by the determination object 220, this is notified to the player by vibration. In this embodiment, when the determination object 220 touches (or hits) the simple shape 230 that is set to the enemy character 206, it is determined that the enemy character 206 concerned is detected by the player character 202 or the radar object 204, and the vibration is generated. Hereinafter, the enemy character 206 detected by the player character 202 or the radar object 204 is simply referred to as the "detected enemy character 206".

As described above, since the determination object 220 is rotated in the plane parallel to the XY plane in the virtual space so as to search for whether the enemy character 206 exists in the 360-degree direction, it is possible to indicate, by the vibration, the position of the detected enemy character 206 viewed from the player character 202 or the radar object 204, whereby the player can specify the position.

Furthermore, since the radar object 204 is rotated together with the determination object 220 in this embodiment, the position of the detected enemy character 206 viewed from the player character 202 or the radar object 204 can be easily specified based on the vibration and an orientation of the radar object 204.

Moreover, in this embodiment, vibration magnitude (or vibration intensity) δ (delta) is calculated (changed) according to a distance d between the player character 202 and the detected enemy character 206. However, since the radar object 204 is provided on the head of the player character 202 in this embodiment, it can be said that the vibration magnitude δ (delta) is changed according to the distance d between the radar object 204 and the detected enemy character 206. Hereinafter, the same applies a case where the vibration magnitude δ (delta) is calculated. Moreover, in this embodiment, the distance d is a linear distance (two-dimensional distance) in the plane parallel to the XY plane; however, a three-dimensional distance may be used.

In this embodiment, when the distance d between the player character 202 and the detected enemy character 206 is less than the predetermined distance (or when in contact), the vibration magnitude δ (delta) is set to a maximum value $δ_m$ (delta-m), and the vibration magnitude δ (delta) is changed in inverse proportion to the distance d or the square of the distance d, or the vibration magnitude δ (delta) is changed gradually (stepwise) according to the distance d.

Furthermore, in this embodiment, as to the vibration magnitude δ (delta), vibration magnitude $δ_L$ (delta-L) by the vibrator 107 provided in the left controller 3 and vibration magnitude $\delta_R$ (delta-R) by the vibrator 117 provided in the right controller 4 are adjusted or controlled according to the position of the detected enemy character 206 with respect to the player character 202. That is, the balance between the magnitude of the left and right vibrations is adjusted or controlled. However, since the radar object 204 is provided on the head of the player character 202 in this embodiment, it can be said that the vibration magnitude $\delta_L$ (delta-L) by the vibrator 107 and the vibration magnitude $\delta_R$ (delta-R) by the vibrator 117 are adjusted or controlled according to a positional relationship between the radar object 204 and the detected enemy character 206. Hereinafter, the same applies to a case where the balance between the magnitude of the left and right vibrations is controlled.

As an example, when the detected enemy character 206 is located in a left side of the player character 202 in the game screen 200, the vibration magnitude (or the vibration intensity) $\delta_L$ (delta-L) by the vibrator 107 is made larger (stronger) than the vibration magnitude $\delta_R$ (delta-R) by the vibrator 117. On the other hand, when the detected enemy character 206 is located in a right side of the player character 202 in the game screen 200, the vibration magnitude (or the vibration intensity) $\delta_R$ (delta-R) by the vibrator 117 is made larger (stronger) than the vibration magnitude $\delta_L$ (delta-L) by the vibrator 107. Moreover, when the detected enemy character 206 is in front or rear of the player character 202 in the game screen 200, that is, when the player character 202 and the detected enemy character 206 are lined on a vertical straight line, the vibration magnitude (delta-L) by the vibrator 107 is made equal to the vibration magnitude $\delta_R$ (delta-R) by the vibrator 117.

In the game screen 200, it is possible to determine whether the detected enemy character 206 is in the left side of the player character 202, in the right side, or in the front or rear side based on whether the position of the vibration is in a right side or in a left side with respect to a virtual straight line passing the position of the virtual camera and the position of the player character 202, or on the virtual straight line.

However, when the virtual straight line touches the detected enemy character 206, it is determined that the detected enemy character 206 is located in front or rear of the player character 202. That is, when the detected enemy character 206 deviates to a position that does not touch (or does not hit) the virtual straight line, it is determined that the detected enemy character 206 is located in the left side or the right side of the player character 202.

In this embodiment, the vibration magnitude $\delta$ (delta) is calculated according to [equation 1] based on the position of the detected enemy character 206 with respect to the player character 202.

$$\delta_L = \alpha \times \delta, \delta_R = \beta \times \delta \qquad \text{[Equation 1]}$$

where coefficients $\alpha$ (alpha) and $\beta$ (beta) are set dependent on whether the detected enemy character 206 is located in the left side, in the right side, or in a deep (rear) side or front side of the player character 202. In this embodiment, when the detected enemy character 206 is located in the left side of the player character 202, the coefficient $\alpha$ (alpha) is set to 1.0 and the coefficient $\beta$ (beta) is set to 0.2. On the other hand, when the detected enemy character 206 is located in the right side of the player character 202, the coefficient $\alpha$ (alpha) is set to 0.2 and the coefficient $\beta$ (beta) is set to 1.0. However, when the detected enemy character 206 is located in the front or rear side of the player character 202, the coefficient $\alpha$ (alpha) and the coefficient $\beta$ (beta) are set to initial values ($\alpha=\beta=1.0$). That is, when the detected enemy character 206 is located in the left side of the player character 202, a ratio of the magnitude of the left and right vibrations is set to 5:1, and when located in the right side, the ratio of the magnitude of the left and right vibrations is set to 1:5, and when located in the front or rear side, the ratio of the magnitude of left and right vibrations is set to 1:1.

This is an example, and it is sufficient just to express the positional relationship between the player character 202 and the detected enemy character 206 with the vibration magnitude, when the vibration magnitude is to be reduced, the coefficient $\alpha$ (alpha) or $\beta$ (beta) may be set to zero (0) so as not to generate the vibration (that is, set the vibration magnitude to zero (0)). For example, when the detected enemy character 206 is located just beside to the player character 202, the vibration on the opposite side (that is, a side that the detected enemy character 206 does not exist) may be set to zero (0), thereby to cause the player to recognize that. Moreover, when making the vibration magnitude larger, the coefficient $\alpha$ (alpha) or $\beta$ (beta) may be set to a numerical value larger than 1.0.

As described above, since the player character 202 or the radar object 204 searches, in the XY plane of the virtual space or the plane parallel to the XY plane, for whether the enemy character 206 exists in the 360-degree direction, the balance of the magnitude of the left vibration and the right vibration is controlled according to a direction of the detected enemy character 206 with respect to the player character 202. Moreover, when controlling the balance of the magnitude of the left vibration and the right vibration, one of the vibrations may be set to zero (0), and therefore, it can be said that the magnitude of either the left vibration or the right vibration is made larger according to the direction of the detected enemy character 206 with respect to the player character 202.

Moreover, since the determination object 220 is rotated in the plane parallel to the XY plane and the balance of the magnitude of the vibrations in the left controller 3 and the right controller 4 is controlled according to the positional relationship between the player character 202 and the detected enemy character 206, even if the enemy character 206 is hidden by the background object 208, the position of the detected enemy character 206 can be more easily specified based on the magnitude of the left and right vibrations.

Figure 12:
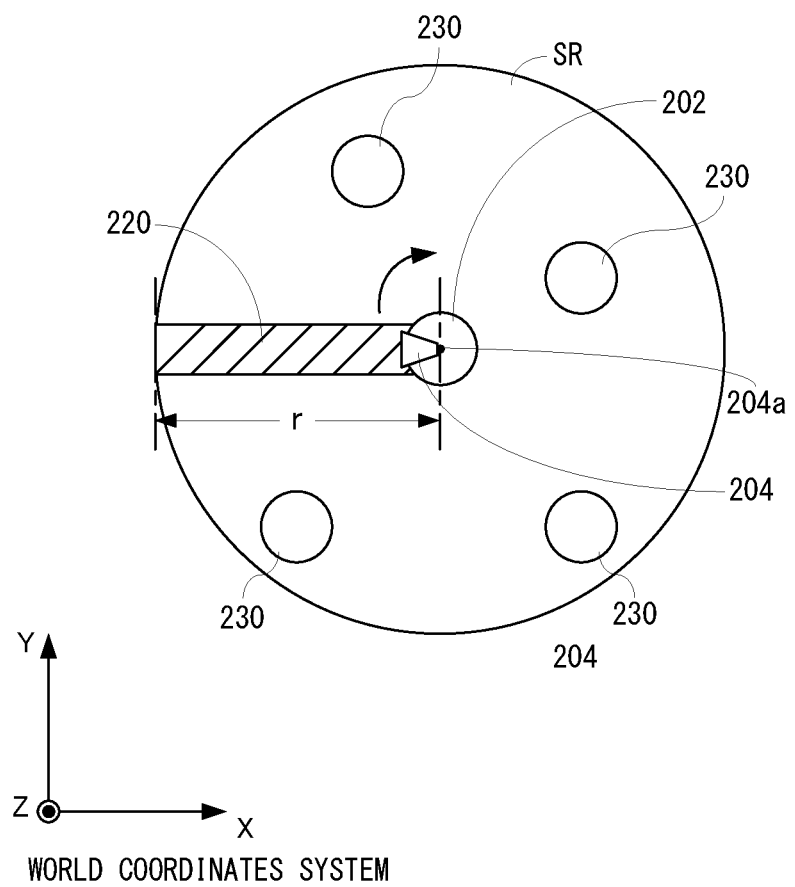
FIG. 12 is an illustration view showing a further non-limiting example determination object that is set to the player character.

In addition, since the vibration is generated when the determination object 220 touches the simple shape 230 set to the enemy character 206 in this embodiment, in order to lengthen a period that the vibration is being generated, a width of the determination object 220 of a direction parallel to the XY plane may be increased as shown in FIG. 12. If doing this way, it is possible to indicate the position of the detected enemy character 206 viewed from the player character 202 or the radar object 204 more intelligibly. However, when the number of the enemy characters 206 is large and they are located close to each other, if the width of the determination object 220 of the direction parallel to the XY plane is increased, the determination object 220 may touch two or more enemy characters 206 at once. Therefore, it is necessary to set the width of the determination object 220 of the direction parallel to the XY plane according to the numbers and those positional relationships of the enemy characters 206.

Moreover, without fixing the width of the determination object 220 of the direction parallel to the XY plane, the width may be variably set according to the degree of difficulty or the level of the game, or the number of the enemy characters 206.

As described above, the distance d between the player character 202 and the detected enemy character 206 is calculated in response to detection of the enemy character 206 by the player character 202 or the radar object 204, and the vibration magnitude δ (delta) is determined by this distance d. Furthermore, the balance of the vibration magnitude $δ_L$ (delta-L) of the vibrator 107 and the vibration magnitude 6R (delta-R) of the vibrator 117 is controlled according to the positional relationship between the player character 202 and the detected enemy character 206. A left vibration signal 854h and a right vibration signal 854i (see FIG. 13) for generating the vibrations with the magnitude $δ_L$ (delta-L) and $δ_R$ (delta-R) having the controlled balance are calculated. In this embodiment, the vibration signals are digital signals each indicating a frequency and an amplitude for every unit time. Therefore, the vibration signals (that is, the left vibration signal 854h and the right vibration signal 854i) each having a predetermined frequency and an amplitude determined according to the magnitude $δ_L$ (delta-L) and $δ_R$ (delta-R) are calculated.

Figure 13:
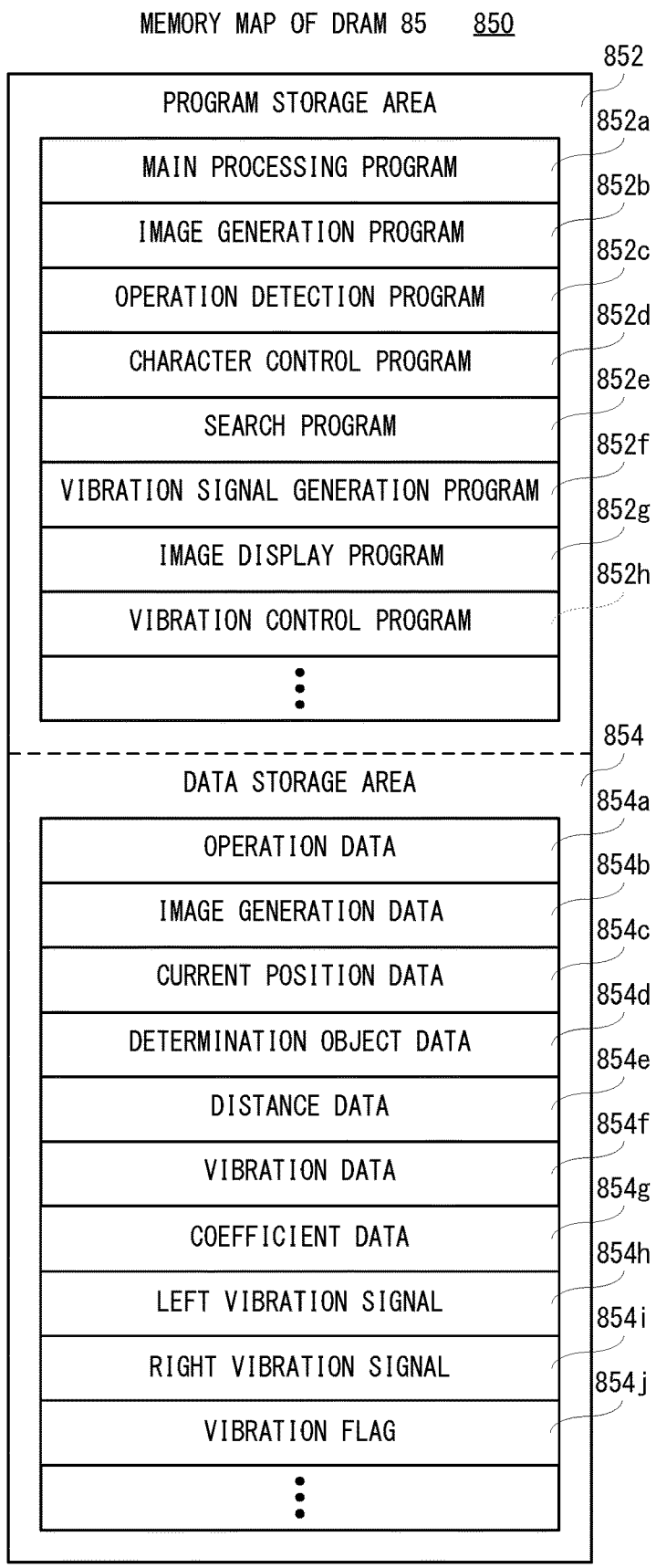
FIG. 13 is an illustration view showing a non-limiting example memory map of a DRAM of the main body apparatus shown in FIG. 6.

FIG. 13 is an illustration view showing a non-limiting example memory map 850 of the DRAM 85 shown in FIG. 6. As shown in FIG. 13, the DRAM 85 includes a program storage area 852 and a data storage area 854. The program storage area 852 is stored with a program of a game application (i.e., a game program). As shown in FIG. 13, the game program includes a main processing program 852a, an image generation program 852b, an operation detection program 852c, a character control program 852d, a search program 852e, a vibration signal generation program 852f, etc.

However, a function of displaying images such as a generated game image and a function of generating a vibration(s) according to the generated vibration signal(s) are functions that the main body apparatus 2 is provided with. Therefore, the image display program 852g and the vibration control program 852h are not included in the game program.

Although detailed description is omitted, at a proper timing after a power of the main body apparatus 2 is turned on, a part or all of each of the programs 852a-852h is read from the flash memory 84 or/and a storage medium attached to the slot 23 so as to be stored in the DRAM 85. However, a part or all of each of the programs 852a-852h may be acquired from other computers capable of performing communication with the main body apparatus 2.

The main processing program 852a is a program for executing overall game processing of a virtual game of this embodiment. The image generation program 852b is a program for generating, using image generation data 854b, display image data corresponding to various kinds of images such as a game image.

The operation detection program 852d is a program for acquiring the operation data 854a from the left controller 3 or/and the right controller 4. The character control program 852d is a program for controlling an action or motion of the player character 202 based on an operation of the player, and controlling an action or motion of the non-player object or the non-player character including the radar object 204 and the enemy character 206 regardless of an operation of the player.

The search program 852e is a program for searching for (or detecting), by the radar object 204, a target character (in this embodiment, the enemy character 206) existing in the search range SR centered on the player character 202. Specifically, the search program 852e is a program for determining whether the determination object 220 touches the enemy character 206 while rotating and moving the determination object 220 around the player character 202. However, the search program 852e determines that the enemy character 206 is detected when the determination object 220 touches the enemy character 206.

The vibration signal generation program 852f is a program for generating, in response to occurrence of a predetermined event, the left vibration signal 854h that is for driving the vibrator 107 incorporated in the left controller 3 and the right vibration signal 854i that is for driving the vibrator 117 incorporated in the right controller 4. In this embodiment, as described above, when the enemy character 206 is detected by the player character 202 or the radar object 204, the distance d between the player character 202 and the detected enemy character 206 is calculated, and the vibration magnitude δ (delta) is determined according to this distance d. Furthermore, the balance of the vibration magnitude $δ_L$ (delta-L) of the vibrator 107 and the vibration magnitude $δ_R$ (delta-R) of the vibrator 117 is controlled according to the positional relationship between the player character 202 and the detected enemy character 206. The left vibration signal 854h and the right vibration signal 854i for generating the vibrations with the vibration magnitude $δ_L$ (delta-L) and $δ_R$ (delta-R) having the controlled balance are calculated.

The image display program 852g is a program for outputting to a display the display image data generated according to the image generation program 852b. Therefore, the images (that is, the game screens 200, etc.) corresponding to the display image data are displayed on the display such as the display 12.

The vibration control program 852h is a program for driving and controlling the vibrator 107 of the left controller 3 using the left vibration signal 854h that is calculated according to the vibration signal generation program 852f and the vibrator 117 of the right controller 4 using the right vibration signal 854i that is calculated according to the vibration signal generation program 852f.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with operation data 854a, image generation data 854b, current position data 854c, determination object data 854d, distance data 854e, vibration data 854f, coefficient data 854g, left vibration data 854h, right vibration data 854i, etc.

The operation data 854a is operation data received from the left controller 3 or/and the right controller 4. In this embodiment, when the main body apparatus 2 receives the operation data from both the left controller 3 and the right controller 4, the main body apparatus 2 stores the operation data 854a classified into the left controller 3 and the right controller 4, respectively.

The image generation data 854b is data required for generating the display image data, such as polygon data and texture data.

The current position data 854c is data of position coordinates of the characters or the objects capable of moving in the virtual space in the current frame, such as the player character 202, the radar object 204 and the enemy character 206. Moreover, the current position data 854c also includes data of the determination object 220 and the simple shape 230 for collision (or hit) determination about the player character 202 and the enemy character 206. However, the data of the determination object 220 is data of the center position of the player character 202 and the predetermined length h, and the data of the simple shape 230 is data of the center position and the radius r for each enemy character 206.

The determination object data 854d is data of the position and the orientation in the current frame of the determination object 220. The distance data 854e is data of the distance d between the player character 202 and the detected enemy character 206 in the virtual space.

The vibration data 854f is data of the vibration magnitude δ (delta) calculated according to the distance d between the player character 202 and the detected enemy character 206 in the virtual space indicated by the distance data 854e. A calculation method of the vibration magnitude δ (delta) is as having described above. The coefficient data 854g is data of the coefficient α (alpha) and coefficient 13 (beta) for controlling the balance of the vibration magnitude 61_, (delta-L) and the vibration magnitude 6R (delta-R). The left vibration signal 854h is a vibration signal for driving the vibrator 107. The right vibration signal 854i is a vibration signal for driving the vibrator 117.

Moreover, the data storage area 854 of the DRAM 85 is provided with a vibration flag 854j. The vibration flag 854j is a flag for determining whether the vibration is to be generated. The vibration flag 854j is turned on when the vibration is to be generated, and turned off when the vibration is not to be generated.

Although illustration is omitted, the data storage area 854 is stored with other data required for executing the game program, and provided with other flags and other timers (counters) required executing the game program.

Figure 14:
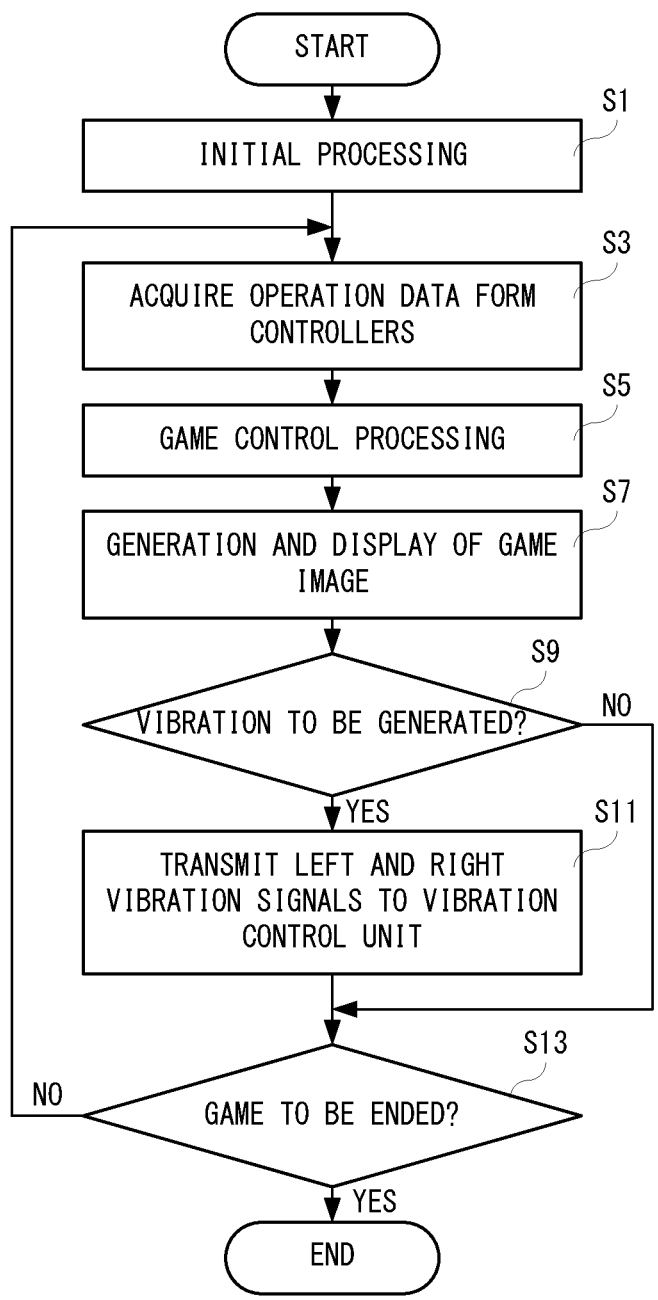
FIG. 14 is a flow chart showing non-limiting example overall game processing of a processor(s) of the main body apparatus shown in FIG. 6.

FIG. 14 is a flowchart showing non-limiting example processing of the game program (overall game processing) by the processor 81 (or computer) of the main body apparatus 2. Although the overall game processing will be described in the following using FIG. 14, duplicate description for a step(s) executing the same processing will be omitted.

However, processing of respective steps of the flowcharts shown in FIG. 14 (also in FIG. 15-FIG. 17) are mere examples, and if the same or similar result is obtainable, an order of the respective steps may be exchanged. Moreover, in this embodiment, it will be described that the processor 81 basically executes the processing of respective steps of the flowcharts shown in FIG. 14-FIG. 17; however, some steps may be executed by a processor(s) or/and a dedicated circuit(s) other than the processor 81.

When a power of the main body apparatus 2 is turned on, prior to execution of the overall game processing, the processor 81 executes a boot program stored in a boot ROM not shown, whereby respective units including the DRAM 85, etc. are initialized. The main body apparatus 2 starts the overall game processing when the execution of the game program of this embodiment is instructed by the player or user.

As shown in FIG. 14, when the overall game processing is started, the processor 81 executes initial processing in a step S1. In the initial processing, the processor 81 constructs a virtual space for generating and displaying the game screen 200, and locates respective characters and respective objects that appear in this virtual space, such as the player character 202, the radar object 204, the enemy character 206 and the background object(s) 208, at their initial positions. Moreover, the processor 81 sets initial values of various parameters used in the game control processing (S5).

In addition, although detailed description is omitted, prior to the start of the overall game processing, it is determined whether the left controller 3 and the right controller 4 are attached to the main body apparatus 2, and when the left controller 3 and the right controller 4 are detached from the main body apparatus 2, pairing processing between the main body apparatus 2, and the left controller 3 and the right controller 4 is executed.

Subsequently, the processor 81 acquires the operation data transmitted from the controller(s) (3, 4) in a step S3, and executes game control processing in a step S5. For example, in the game control processing, an arbitrary action(s) such as moving the player character 202 is executed according to the operation data. Moreover, an arbitrary action(s) such as moving the radar object 204 and the enemy character 206 is executed according to the game program. Furthermore, as necessary, it makes an item(s) appear (be arranged) in the virtual space.

In a next step S7, the processor 81 generates and displays the game image to be displayed on the display 12. Briefly described, the processor 81 generates game image data by reading the data indicating a result of the game control processing in the step S5 and the image generation data 854b from the DRAM 85, and outputs the game image data to the display 12.

Subsequently, it is determined, in a step S9, whether a vibration is to be generated. Here, it is determined whether the vibration flag 854j is turned on.

If "NO" is determined in the step S9, that is, if a vibration is not to be generated, the process proceeds to a step S13. On the other hand, if "YES" is determined in the step S9, that is, if a vibration is to be generated, in a step S11, the left vibration signal 854h and the right vibration signal 854i are transmitted to a vibration control unit. The vibration control unit is an operating system of the main body apparatus 2, and this operating system is also executed by the processor 81. That is, an instruction to vibrate the controller(s) (3, 4) is transmitted to the operating system (that is, the vibration control unit) from the application program. Then, it is determined, in the step S13, whether the game is to be ended. Determination in the step S13 is executed according to whether it becomes the game over, or the player has issued an instruction to end the game, for example. If "NO" is determined in the step S13, that is, if the game is not to be ended, the process returns to the step S3. On the other hand, if "YES" is determined in the step S13, that is, if the game is to be ended, the overall game processing is ended.

Figure 15:
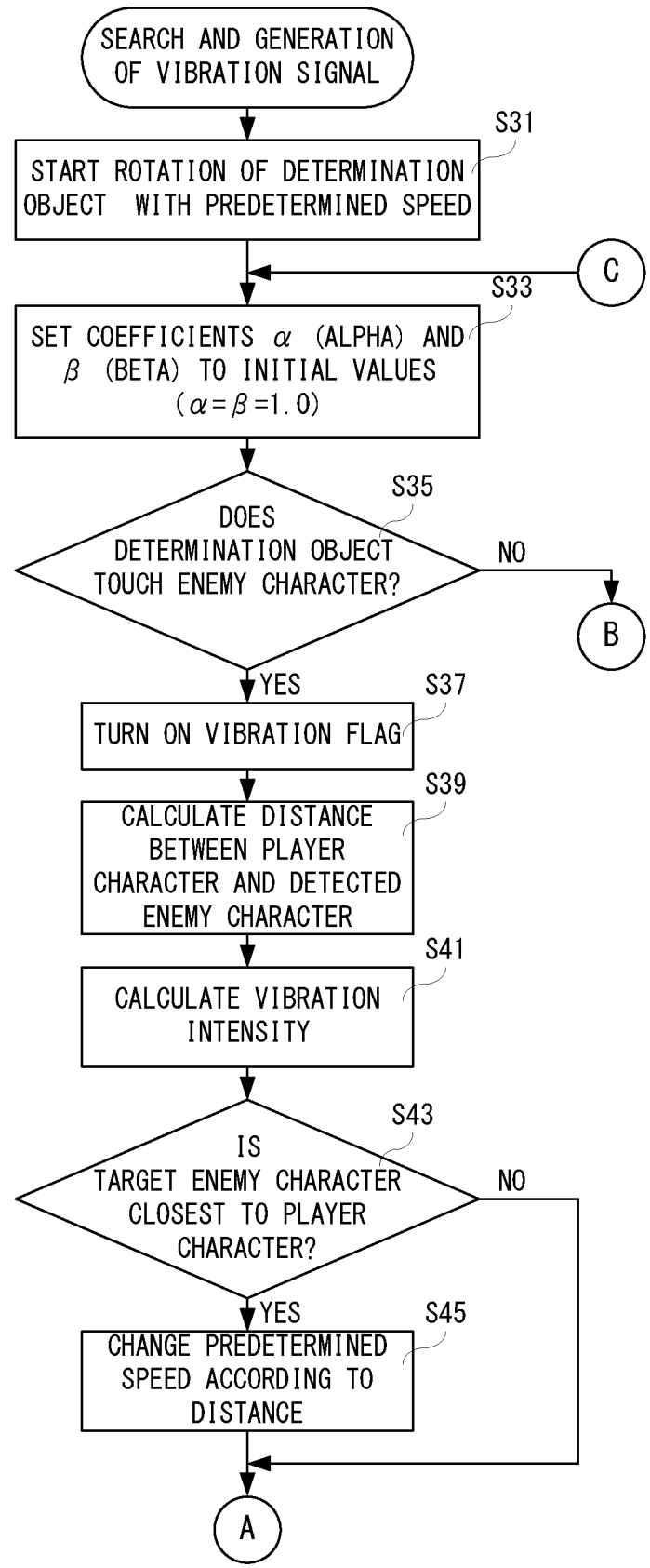
FIG. 15 is a flow chart showing a part of non-limiting example search and vibration signal generation processing of the processor(s) of the main body apparatus shown in FIG. 6.
Figure 16:
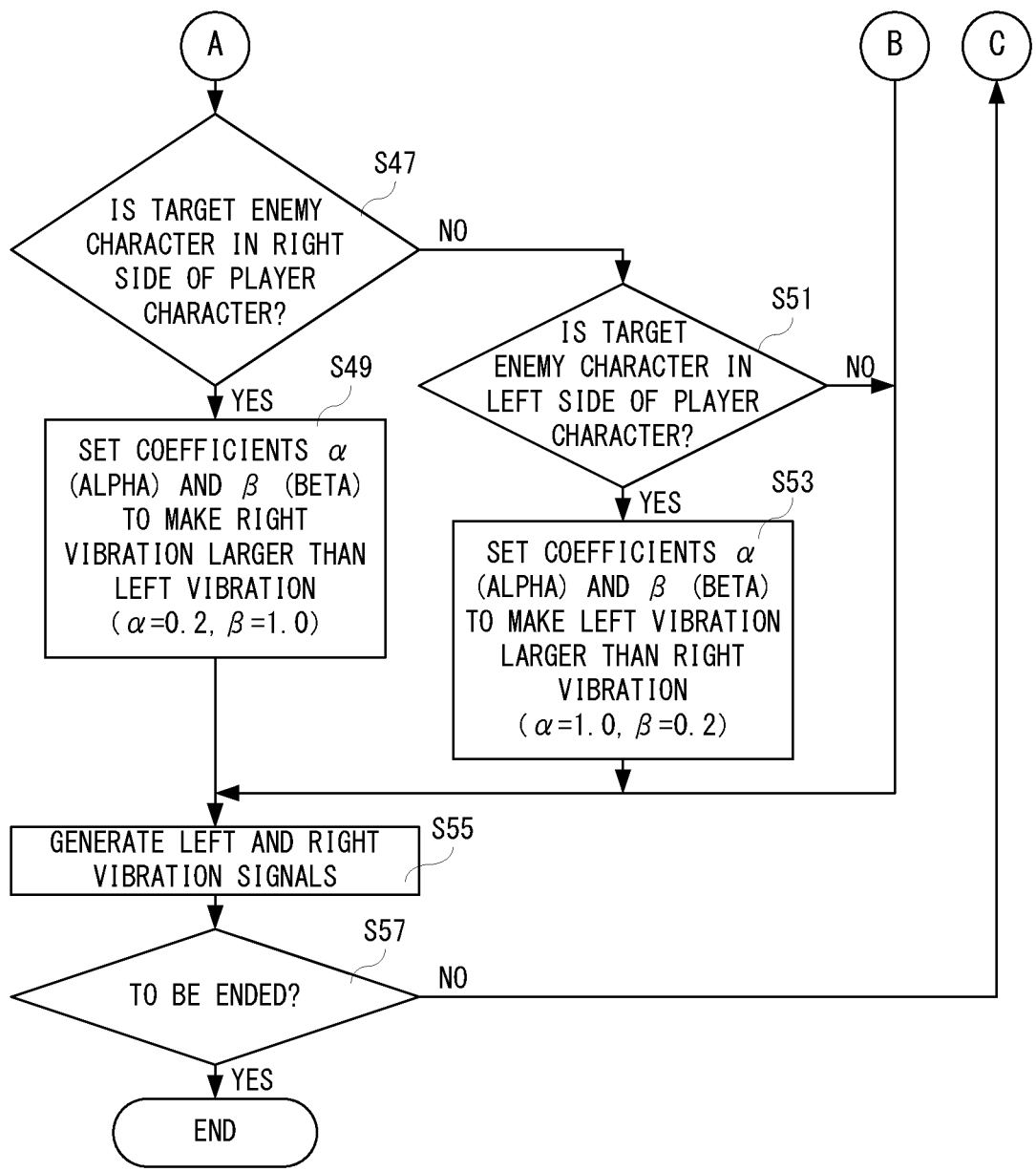
FIG. 16 is a flow chart showing another part of the search and vibration signal generation processing of the processor(s) of the main body apparatus shown in FIG. 6, following FIG. 15.

FIG. 15 and FIG. 16 are flow charts showing non-limiting example search processing of the processor 81 (or computer) of the main body apparatus 2. This search and vibration signal generation processing is executed by the processor 81 in parallel to the overall game processing shown in FIG. 14. However, the search and vibration signal generation processing is not executed in a scene where the enemy character 206 is not to be searched by the radar object 204, or when the player character 202 is not equipped with the radar object 204.

As shown in FIG. 15, if the search and vibration signal generation rocessing is started, the processor 81 starts rotation of the determination object 220 at the predetermined speed in the step S31. However, it is not necessary to actually draw and rotate the determination object 220 (or determination area), and respective positions of a plurality of points included in the determination object 220 are calculated for each frame. The position coordinates data corresponding to the respective positions of the plurality of points included in the determination object 220 are stored or updated, as the determination object data 854*d*, in the data storage area 854.

In a subsequent step S33, the coefficients α (alpha) and β (beta) are set to their initial values (α=β=1.0). In a next step S35, it is determined whether the determination object 220 touches the enemy character 206. That is, the processor 81 determines whether the determination object 220 touches the simple shape 230 that is set to the enemy character 206.

If "NO" is determined in the step S35, that is, if the determination object 220 does not touch the enemy character 206, the process proceeds to a step S55 shown in FIG. 16. On the other hand, if "YES" is determined in the step S35, that is, if the determination object 220 touches the enemy character 206, the vibration flag 854*j* is turned on in a step S37, and in a step S39, the distance d between the player character 202 and the enemy character 206 concerned, i.e., the detected enemy character 206 is calculated. At this time, the distance data 854*e* of the calculated distance d is stored or updated in the data storage area 854.

In a next step S41, the vibration magnitude δ (delta) is calculated according to the distance d that is calculated in the step S39. The calculation method of the vibration magnitude δ (delta) is as having described above. At this time, the vibration data 854*f* of the calculated vibration magnitude δ (delta) is stored or updated in the data storage area 854. In a subsequent step S43, it is determined whether the detected enemy character 206 is the enemy character 206 at a position nearest the player character 202.

If "NO" is determined in the step S43, that is, if the detected enemy character 206 is not the enemy character 206 at the position nearest the player character 202, the process proceeds to a step S47 shown in FIG. 16. On the other hand, if "YES" is determined in the step S43, that is, if the detected enemy character 206 is the enemy character 206 at the position nearest the player character 202, in a step S45, the predetermined speed is changed according to the distance d calculated in the step S39, and the process proceeds to the step S47.

In the step S47 shown in FIG. 16, it is determined whether the detected enemy character 206 is in the right side of the player character 202. If "YES" is determined in the step S47, that is, if the detected enemy character 206 is in the right side of the player character 202, the coefficients α (alpha) and β (beta) are set so as to make the vibration in the right larger than in the left in a step S49, and then, the process proceeds to a step S55. That is, in the step S49, the processor 81 sets α=0.2 and β=1.0. The coefficient data 854*g* is updated at this time.

Moreover, if "NO" is determined in the step S47, that is, if the detected enemy character 206 is not in the right side of the player character 202, it is determined, in a step S51, whether the detected enemy character 206 is in the left side of the player character 202.

If "NO" is determined in the step S51, that is, if the detected enemy character 206 is not in the left side of the player character 202, the process proceeds to the step S55. On the other hand, if "YES" is determined in the step S51, that is, if the detected enemy character 206 is in the left side of the player character 202, the coefficients α (alpha) and β (beta) are set so as to make the vibration in the left larger than in the right in a step S53, and then, the process proceeds to the step S55. That is, in the step S53, the processor 81 sets α=1.0 and β=0.2. The coefficient data 854*g* is updated at this time.

In the step S55, the left vibration signal 854*h* and the right vibration signal 854*i* are generated according to the equation 1. At this time, the vibration magnitude δ (delta) calculated in the step S41 and the coefficients α (alpha) and β (beta) set in the step S33, S49 or S53, i.e., the coefficient data 854*g* are used.

Then, it is determined, in a step S57, whether it is to be ended. Here, the processor 81 determines whether the current scene is a scene that does not search for the enemy character 206, or the radar object 204 is detached from the player character 202.

If "NO" is determined in the step S57, that is, if it is not to be ended, the process returns to the step S33 shown in FIG. 15. On the other hand, if "YES" is determined in the step S57, that is, if it is to be ended, the search and vibration signal generation processing is ended.

Figure 17:
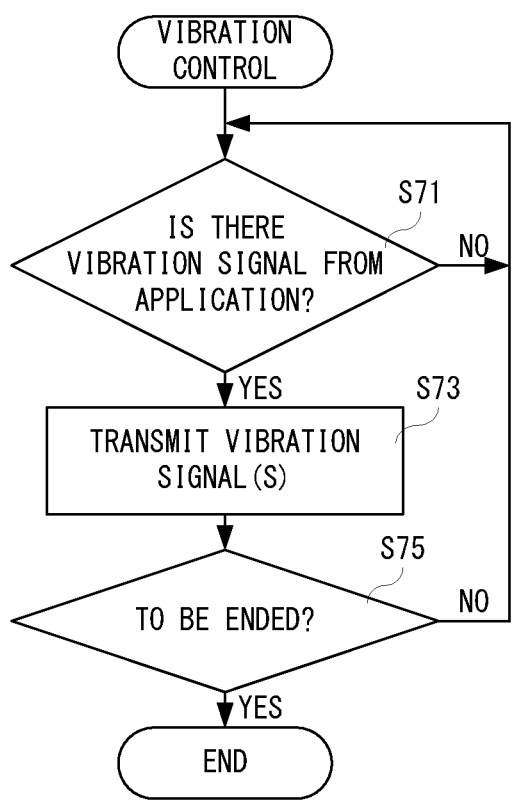
FIG. 17 is a flow chart showing non-limiting example vibration control processing of the processor(s) of the main body apparatus shown in FIG. 6.

FIG. 17 is a flow chart showing a non-limiting example vibration control processing of the processor 81 shown in FIG. 6. For example, when the processor 81 is requested (instructed) to generate vibration from the application program, the processor 81 starts the vibration control processing. However, the vibration control processing is executed respectively for the left vibration signal 854*h* and the right vibration signal 854*i* in parallel to each other.

As shown in FIG. 17, if the vibration control processing is started, the processor 81 determines, in a step S71, whether the vibration signal is input from the application program, i.e., the game program. If "NO" is determined in the step S71, that is, if the vibration signal is not input from the application program, the process returns to the step S71.

On the other hand, if "YES" is determined in the step S71, that is, if the vibration signal is input from the application program, in a step S73, the vibration signal(s) (the left vibration signal 854*h* or/and the right vibration signal 854*i*) is transmitted to a corresponding controller(s) (3, 4). Therefore, in the controller(s) (3, 4) receiving the vibration signal(s), the vibrator(s) (107, 117) will be driven according to the vibration signal(s).

Then, in a step S75, it is determined whether it is to be ended. Here, the processor 81 determines whether the application having processing that the vibration is to be presented is ended, or whether a scene that the vibration is to be presented is ended in the application. If "NO" is determined in the step S75, that is, if it is not to be ended, the process returns to the step S71. If "YES" is determined in the step S75, that is, if it is to be ended, the vibration control processing is ended.

According to this embodiment, since the determination object is rotated around the player character, and if the determination object touches the enemy character, the vibration is generated in the controller(s), it is possible to provide a novel game program, game system, game apparatus and game controlling method. Moreover, the position of the enemy character in the 360-degree direction around the position of the player character can be easily indicated by vibration. Therefore, the player can know the position of the enemy character in the 360-degree direction around the position of the player character by vibration.

Moreover, according to this embodiment, since the radar object is rotated and displayed together with the rotation of the determination object, even if a plurality of enemy characters exist in the search range, it is possible to easily know respective positions of the enemy characters by perceiving the rotation and the information of the vibration.

Furthermore, according to this embodiment, by maintaining or controlling the balance of the vibrations of the left and right controllers, it is notified whether the position of the detected enemy character is in the left side or the right side of the player character, and further, by generating the vibration according to the rotation of the determination object, it is possible to identify not only the left or the right but also the front or the rear, so that the position or/and the direction of the detected enemy character with respect to the player character can be easily known.

In addition, although the radar object is attached to the head of the player character to search for the enemy character, an operation object and a target object do not need to be limited to these.

The enemy character may be searched by locating a further operation object such as a radar object or a sensor owned by the player character at a position separated from the player character. In such a case, the movement of the further operation object may be operated directly by the player, or the further operation object may be moved in the virtual space following movement of the player character that the player operates.

Moreover, other target objects such as items, treasure and ally characters may be searched instead of the enemy character.

Furthermore, in this embodiment, when the position of the detected enemy character is located in the left side or the right side of the player character, the coefficients α (alpha) and β (beta) are set to the predetermined values in order to make a ratio of the left vibration magnitude and the right vibration magnitude be a predetermined ratio, but it does not need to be limited to this. Values that are changed according to the distance d between player character and the detected enemy character may be set as the coefficients α (alpha) and β (beta). In this case, the coefficients α (alpha) and β (beta) are set so that the ratio is biased as the position of the detected enemy character with respect to the player character is separated to the left or the right.

For example, when the position of the detected enemy character is in the left side of the player character, the value of the coefficient β (beta) is changed to 0.8, 0.6, 0.4 and 0.2 as the distance d between the player character and the detected enemy character is made larger. That is, the coefficient β (beta) is changed stepwise. In this case, if the value of the coefficient α (alpha) is fixed at 1.0, the ratio of coefficients α (alpha) and β (beta) is gradually changed as 5:4, 5:3, 5:2 and 5:1. On the other hand, when the position of the detected enemy character is in the right side of the player character, the value of the coefficient α (alpha) is changed to 0.8, 0.6, 0.4 and 0.2 as the distance d between the player character and the detected enemy character is made larger. That is, the coefficient α (alpha) is changed stepwise. In this case, if the value of the coefficient β (beta) is fixed at 1.0, the ratio of coefficients α (alpha) and β (beta) is gradually changed as 4:5, 3:5, 2:5 and 1:5. However, this is an example, and the values of both of coefficients α (alpha) and β (beta) may be changed.

Furthermore, in this embodiment, when a plurality of enemy characters exist in the search range, the rotation speed of the determination object is controlled based on the distance between the player character and the detected enemy character nearest the player character among the plurality of detected enemy characters, but it does not need to be limited to this. When an order or priority to be detected is set each of the plurality of enemy characters, the rotation speed of the determination object may be controlled based on a distance between the player character and the detected enemy character having the highest order or the highest priority among the plurality of detected enemy characters.

Moreover, although the determination object is changed as an example of a method of searching for various target objects in this embodiment, a predetermined shape for collision detection that is to be set to the target object may be changed without changing the determination object, or together with changing of the determination object. For example, the spherical shape or the elliptical spherical shape may be changed to a capsule shape or a cylindrical shape extending in the vertical direction.

Furthermore, although the game system 1 is shown as an example of an information processing system in this embodiment, the structure thereof should not be limited, and it is possible to adopt other structure. For example, although the above-described "computer" is a single computer (specifically, processor 81) in the above-described embodiment, the "computer" may be multiple computers in another embodiment. The above-described "computer" may be (multiple) computers provided on multiple devices, and more specifically, the above-described "computer" may be constituted by the processor 81 of the main body apparatus 2 and communication control units (microprocessors) 101 and 111 provided on the controllers.

Furthermore, in another embodiment, the game control processing shown in FIG. 14 may be executed by a server on a network such as the internet. In such a case, the processor 81 of the main body apparatus 2 transmits the operation data received from the left controller 3 and the right controller 4 to the above-described server via the network communication unit 82 and the network, receives a result of execution of a part of the game control processing by the server (i.e., game image data and the game sound data), thereby displaying the game image on the display 12 and outputting the game sound from the speaker 88. That is, it is possible to constitute an information processing system including the game system 1 shown in the above-described embodiment and the server on the network.

Moreover, although a case where the game image is displayed on the display 12 is described in the above-described embodiment, it does not need to be limited to this. The game image can also be displayed on a stationary monitor (for example, television monitor) by connecting the main body apparatus 2 to the stationary monitor via a cradle. In such a case, it is possible to constitute an information processing system including the game system 1 and the stationary monitor.

Furthermore, although the above-described embodiment is described on a case where the game system 1 having structure that the left controller 3 and the right controller 4 are attachable to or detachable from the main body apparatus 2 is used, it does not need to be limited to this. For example, it is possible to use an information processing apparatus such a game apparatus or further electronic equipment that an operation portion having operation buttons and analog sticks similar to those of the left controller 3 and the right controller 4, and are capable of executing a game program. The further electronic equipment corresponds to smartphones, tablet PCs or the like. In such a case, an operation unit may constitute with software keys.

Furthermore, in another embodiment, instead of the left controller 3 and the right controller 4, other controllers may be used. For example, another controller that is provided, in left and right, with operation buttons, analog sticks and vibrators similar to those of the left controller 3 and the right controller 4 may be communicably connected to the main body apparatus 2.

Moreover, in another embodiment, the left controller 3 and the right controller 4 may be integrally constituted by coupling them to each other to be used as a single controller.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program executable by a computer of an information processing apparatus, wherein the game program causes one or more processors of the computer to execute:
controlling an operation object in a virtual space based on an operation input to an operation device;
arranging a target object that is a search target in the virtual space;
setting a determination area for searching for the target object in the virtual space;
rotating the determination area at a predetermined speed around a position of the operation object; and
generating a vibration signal for causing a vibration device provided in the operation device to vibrate when the target object touches the determination area.

2. The storage medium according to claim 1, wherein the game program causes the one or more processors to execute generating the vibration signal when the determination area touches the target object so as to vibrate more strongly when a distance between the operation object and the target object in the virtual space is shorter than a predetermined distance.

3. The storage medium according to claim 1, wherein the game program causes the one or more processors to execute changing the predetermined speed at which the determination area is rotated according to a distance between the operation object and the target object in the virtual space.

4. The storage medium according to claim 1, wherein the operation device comprises a plurality of vibration devices, and
the game program causes the one or more processors to execute generating the vibration signal when the determination area touches the target object so that intensity of the vibration of any of the plurality of vibration devices is increased according to a direction of a position of the target object with respect to the operation object.

5. The storage medium according to claim 1, wherein the game program causes the one or more processors further to execute arranging a direction object indicating that the search is being performed at the position of the operation object, and rotating the direction object at the same speed as the speed of rotation of the determination area.

6. The storage medium according to claim 1, wherein the game program causes the one or more processors further to execute making, based on an operation input, the operation object perform a predetermined action to the target object.

7. A game system comprising a control circuit and an operation device, wherein the control circuit is configured to execute:
controlling an operation object in a virtual space based on an operation input to the operation device;
arranging a target object that is a search target in the virtual space;
setting a determination area for searching for the target object in the virtual space;
rotating the determination area at a predetermined speed around a position of the operation object; and
generating a vibration signal for causing a vibration device provided in the operation device to vibrate when the target object touches the determination area.

8. The game system according to claim 7, wherein the control circuit is configured to execute generating the vibration signal when the determination area touches the target object so as to vibrate more strongly when a distance between the operation object and the target object in the virtual space is shorter than a predetermined distance.

9. The game system according to claim 7, wherein the control circuit is configured to execute changing the predetermined speed at which the determination area is rotated according to a distance between the operation object and the target object in the virtual space.

10. The game system according to claim 7, wherein the operation device comprises a plurality of vibration devices, and
the control circuit is configured to execute generating the vibration signal when the determination area touches the target object so that intensity of the vibration of any of the plurality of vibration devices is increased according to a direction of a position of the target object with respect to the operation object.

11. The game system according to claim 7, wherein the control circuit is configured further to execute arranging a direction object indicating that the search is being performed at the position of the operation object, and rotating the direction object at the same speed as the speed of rotation of the determination area.

12. The game system according to claim 7, wherein the control circuit is configured further to execute making, based on an operation input, the operation object perform a predetermined action to the target object.

13. A game apparatus comprising a control circuit and an operation device, wherein the control circuit is configured to execute:
controlling an operation object in a virtual space based on an operation input to the operation device;
arranging a target object that is a search target in the virtual space;
setting a determination area for searching for the target object in the virtual space;
rotating the determination area at a predetermined speed around a position of the operation object; and
generating a vibration signal for causing a vibration device provided in the operation device to vibrate when the target object touches the determination area.

14. The game apparatus according to claim 13, wherein the control circuit is configured to execute generating the vibration signal when the determination area touches the target object so as to vibrate more strongly when a distance between the operation object and the target object in the virtual space is shorter than a predetermined distance.

15. The game apparatus according to claim 13, wherein the control circuit is configured to execute changing the predetermined speed at which the determination area is rotated according to a distance between the operation object and the target object in the virtual space.

16. The game apparatus according to claim 13, wherein the operation device comprises a plurality of vibration devices, and
the control circuit is configured to execute generating the vibration signal when the determination area touches the target object so that intensity of the vibration of any of the plurality of vibration devices is increased according to a direction of a position of the target object with respect to the operation object.

17. The game apparatus according to claim 13, wherein the control circuit is configured further to execute arranging a direction object indicating that the search is being performed at the position of the operation object, and rotating the direction object at the same speed as the speed of rotation of the determination area.

18. The game apparatus according to claim 13, wherein the control circuit is configured further to execute making, based on an operation input, the operation object perform a predetermined action to the target object.

19. A game controlling method, comprising:
controlling an operation object in a virtual space based on an operation input to an operation device;
arranging a target object that is a search target in the virtual space;
setting a determination area for searching for the target object in the virtual space;
rotating the determination area at a predetermined speed around a position of the operation object; and
generating a vibration signal for causing a vibration device provided in the operation device to vibrate when the target object touches the determination area.

20. The game controlling method according to claim 19, further comprising generating the vibration signal when the determination area touches the target object so as to vibrate more strongly when a distance between the operation object and the target object in the virtual space is shorter than a predetermined distance.

21. The game controlling method according to claim 19, further comprising changing the predetermined speed at which the determination area is rotated according to a distance between the operation object and the target object in the virtual space.

22. The game controlling method according to claim 19, wherein the operation device comprises a plurality of vibration devices, and further comprising
generating the vibration signal when the determination area touches the target object so that intensity of the vibration of any of the plurality of vibration devices is increased according to a direction of a position of the target object with respect to the operation object.

23. The game controlling method according to claim 19, further comprising arranging a direction object indicating that the search is being performed at the position of the operation object, and rotating the direction object at the same speed as the speed of rotation of the determination area.

24. The game controlling method according to claim 19, further comprising making, based on an operation input, the operation object perform a predetermined action to the target object.

* * * * *